Figure 1:
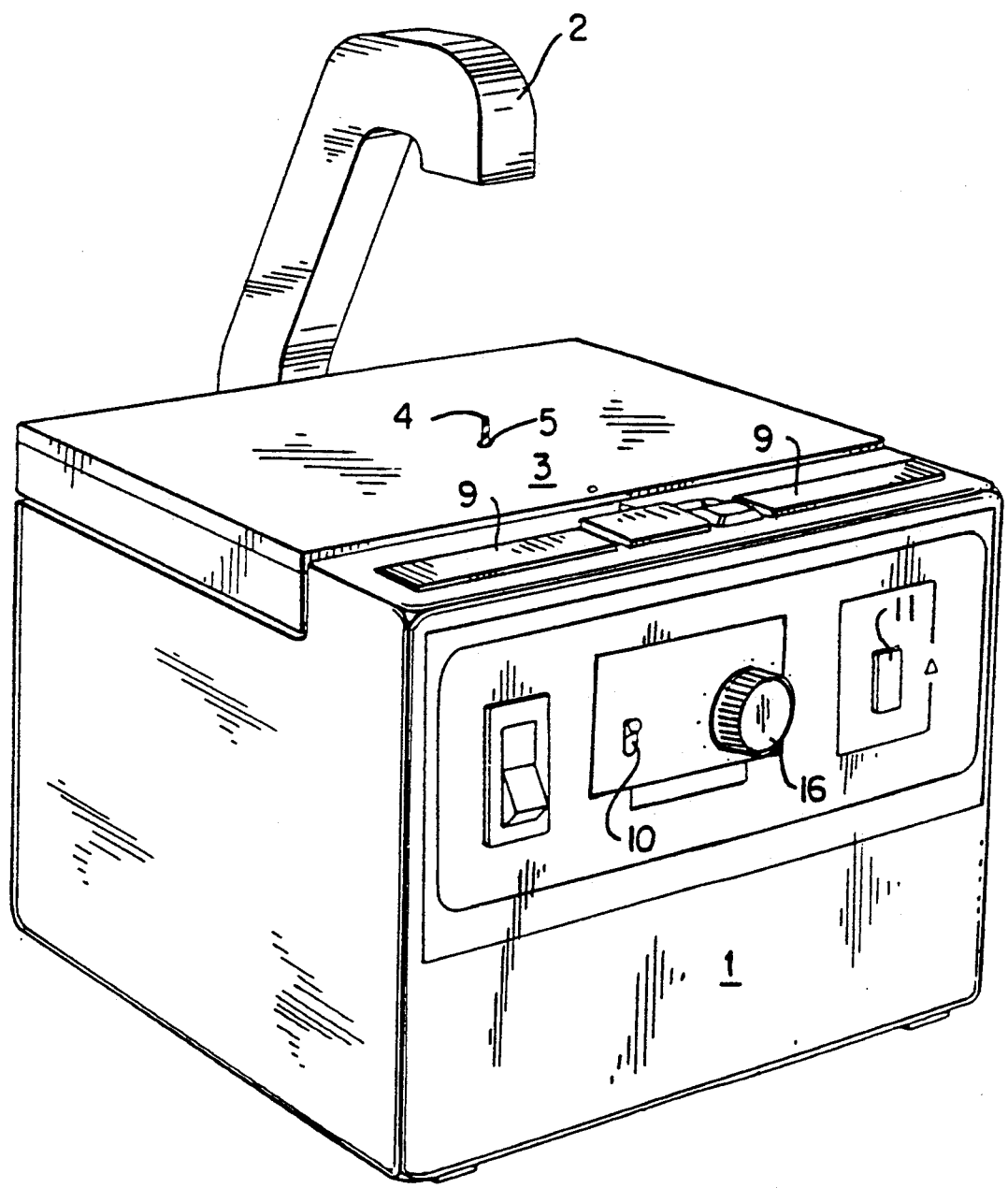

United States Patent [19]

Gregorio Gracia

[11] Patent Number: 5,118,227
[45] Date of Patent: Jun. 2, 1992

[54] TEMPLATE BORING MACHINES

[76] Inventor: Oscar R. Gregorio Gracia, Rio Manzanares, 31, bajo B. 28913 Leganes, Madrid, Spain

[21] Appl. No.: 477,077

[22] Filed: Feb. 8, 1990

[51] Int. Cl.$^5$ .............................................. B23B 39/00
[52] U.S. Cl. .................................................. 408/16
[58] Field of Search ................ 408/16, 14, 3, 6, 9, 408/10, 129

[56] References Cited

U.S. PATENT DOCUMENTS

| 3,120,136 | 2/1964 | Bieker | 408/1 R |
| 3,728,027 | 4/1973 | Watanabe | 408/16 |
| 3,854,836 | 12/1974 | Weissman | 408/16 |

FOREIGN PATENT DOCUMENTS 2606378  9/1976  Fed. Rep. of Germany ........ 408/16
456122  11/1936  United Kingdom ................. 408/16

Primary Examiner—Daniel W. Howell
Attorney, Agent, or Firm—Darby & Darby

[57] ABSTRACT

Improvements in template boring machines, formed because they leave the platform fixed and the bit with an up and down movement, by means of a circuit with various multivibrators connected to one another by different relay sections, allowing movement of the rotating motors and lift and fall of the bit; automatic cycle repeat, by means of end of stroke microswitches designed in the lift and fall motor; acoustic means coupled to warn of end of cycle, and time constant device, for automatic cycle performance, and adjustment of bit, by immobilizing the rotating motor of the bit, and lift movement of the bit to a maximum position, where it is set, returning to automatic performance when a hand switch is pressed.

10 Claims, 4 Drawing Sheets

TEMPLATE BORING MACHINES

STATE OF THE ART

Template boring machines which are used today present the features of a fixed boring tool and table designed with upward and downward movement, so that the boring appears on the surface of the table when the board drops, or is concealed when it goes up, leaving it to the operator to achieve accuracy in the job he is performing.

Furthermore, with the boring machines that are now employed, a reference is used to locate the point which is to be bored, on the upper side of the template, and this reference is based on a luminous point which incides on that of the boring, emitting a ray of light from a fixed emitter located in a place on the work table; this requires the use of a light which is not too powerful in order to eliminate the likelihood of overheating, owing to the length of time the job lasts, with the consequent replacements of fused light bulbs.

DESCRIPTION

Improvements in template boring machines referred to in this Description basically consist of making the board where the template is located firm, so that the bit performs the corresponding up and down movements to achieve top precision bore holes, using mechanical and electronic devices, permitting both a drill rotating movement and an up and down movement, with very accurate measurements, and in addition allowing for the possibility of an automatic performance when a previously fixed sequence is repeated, by simply varying the position of the template.

A system for illuminating the point that is to be sited has furthermore been devised, using a very powerful lamp, fitted to an optical system which conveys the beam that is emitted to the exact point, without having to place this light vertically over that point, with the consequent possibility of being able to use more powerful lamps which are fitted inside the boring machine unit, and are suitably aired and ventilated to make them last longer.

The above improvements consist basically of creating a circuit which is supplied from the mains, using a system of transformers, where two motors are coupled, one to turn the bit and the other, by suitable reducers, to achieve an up and down movement in it. These motors are inserted in the circuit through control relays, which are suitably activated by the switch which starts up the system, and which make the rotating motor run at the same time as the motor that has the upward movement, which is designed with end of stroke two-way limiter micro-switches which restrict the movement of the bit in these directions at the suitable moments.

In addition to these motors, optical and acoustic warning devices have been designed, to inform the operator when the complete cycle is over, and also automatic devices, for a process repeat performance, without having to push the starter knob again.

In this main circuit, other means for starting up the set light lamp have also been devised, which is included in the unit and via an optical system conveys its light beam to the upright setting of the point that is to be bored, remaining alight for as long as its use is required and which automatically goes out when the job is finished; it lights up again when the light reset switch is pressed.

Devices are also included to adjust the bit, leaving it free of rotating movement with only an up/down movement, to obtain the suitable precision in each case.

A detailed description of the above-mentioned improvements is given below, referring to the drawings which are appended hereto and where a preferent, but in no way a restrictive form of execution is shown as an example, and open to any variations in detail which do not represent a fundamental change in its basic features.

The following aspects are shown in the drawings:

In FIG. 1: General view of the external unit.

Figure 2:
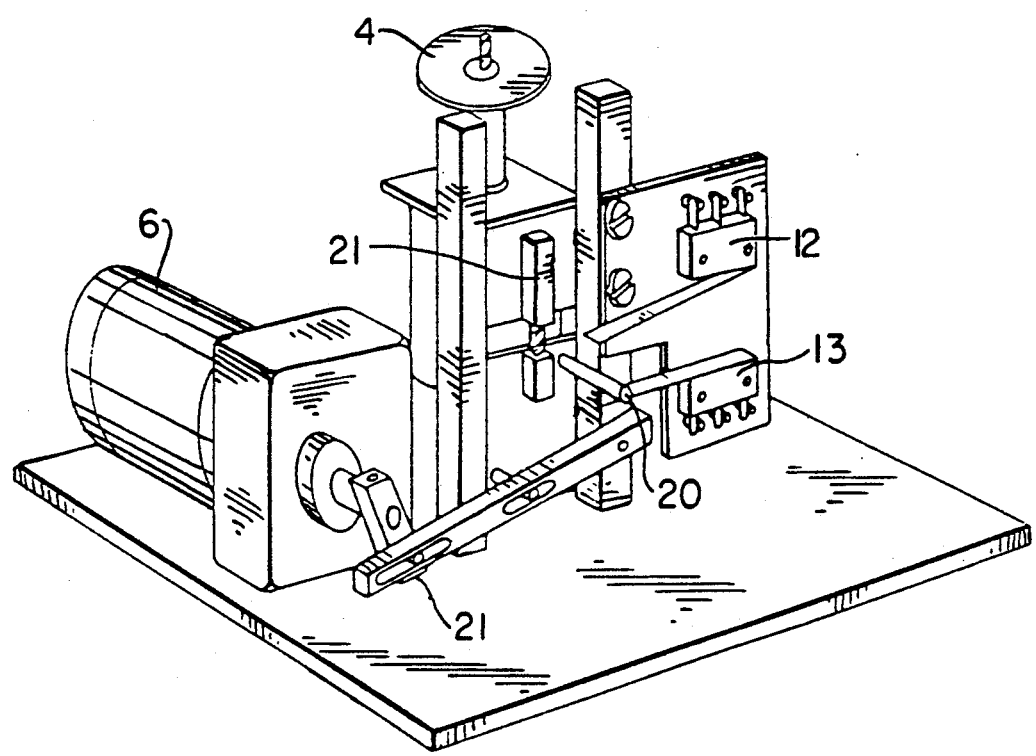

In FIG. 2: Internal diagramatic view of the mechanical system of the rise and fall movement of the bit.

Figure 3:
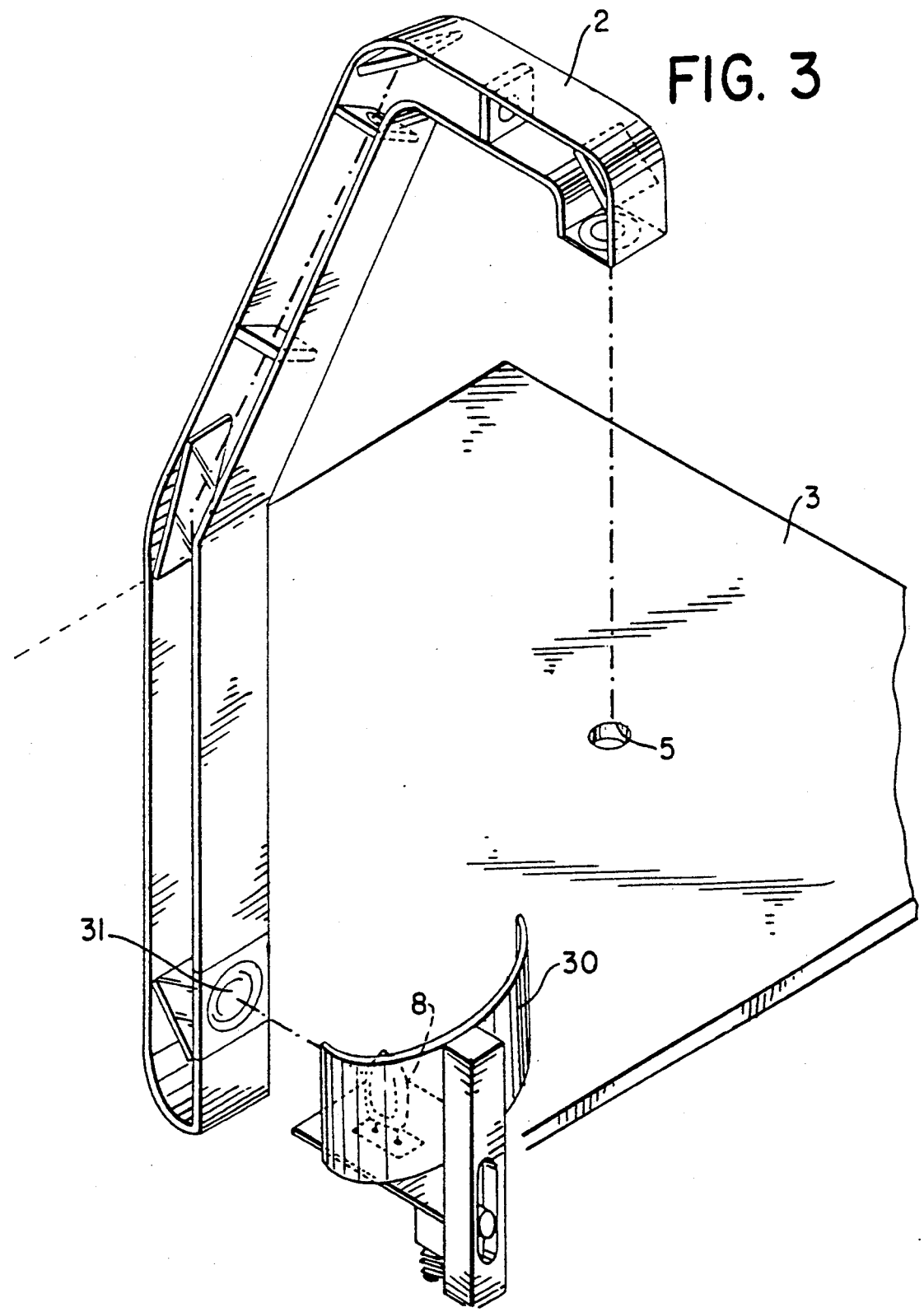

In FIG. 3: Diagramatic view of the set light system.

Figure 4:
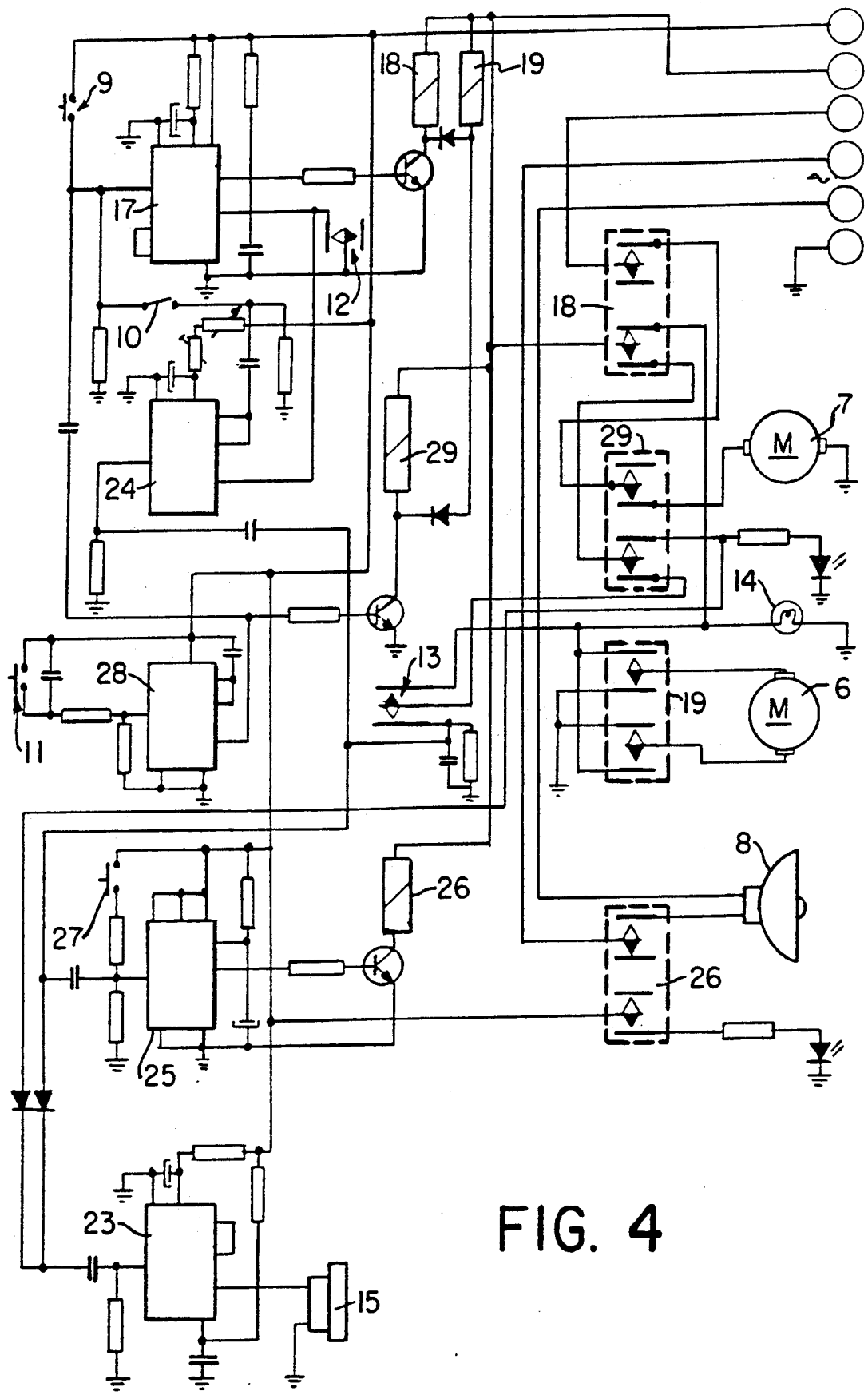

In FIG. 4: General circuit of the improvements.

According to the example of execution which is shown herein, the improvements in template boring machines which are now proposed consist of creating an assembly formed by an outer casing (1) with a firm upper platform (3), and a periscope system (2) for the set light; in the front of this casing are the manual or automatic (10) starter controls, time (16) controls and bit adjustment control (11) such that from this front position all work instructions can be performed for the different operations.

The start control (9) operates on the entrance of a multivibrator (17) which works on relays (18 and 19) where the first (18) start up the boring motor (7) whilst the other relay works on the motor (6) which by a mechanical cam and lever (20) system makes an intermediary unit (21) lift, which is graded in length, and which in turn supplies the upward movement of the bit (4). This system of levers has a shaft (22) which in the upward movement contacts a micro-switch (12) which restricts that upward movement, cutting the inverted movement and making the bit come down, until a shank (22) works on another micro-switch (13) which limits the fall, whereupon the motor (6) is detained.

At the same time, when the inverted motor movement takes place(6) the motor is stopped (7) and relays (18 and 19) are idle, and another multivibrator is worked (23) whose exit is linked with a piezoelectric buzzer (15) which emits a tone for a length of time marked by the potentiometer (16) to alert that the complete cycle has concluded. This same impulse also works on the inlet of another multivibrator (24) whose inverted outlet drops in level whilst the time period set potentiometer works, and at the end of this period of time, its upper side, if the automatic switch (10) is off, produces an activation of the first multivibrator (17) thus reinitiating the described movement of motors, and the full cycle is once more repeated.

Furthermore, the pulse originated in the microswitch (13) also works on the inlet of another multivibrator (25) which keeps the relay (26) activated and this turns on the light (8) of the fixture light column. Once the above-mentioned time has elapsed, without a new pulse coming, the relay (26) is turned off and the light goes out, and will not come on again until the light reset switch (27) is worked which has access to the multivibrator inlet (25).

In order to adjust the bit, without this turning, there is a knob (11) which works on a divider (28) which in turn works on the first multivibrator (17) and activates the relays (18 and 19) and at the same time activates another relay (29) which prevents the boring motor from turning, thus producing an upward movement of same but without turning, in order to adjust the height and consequently the depth of the boring on the template which is placed on the platform (3). This setting remains static, whilst the regulator (21) is worked to place the bit in the required position, and when the bit adjustment knob (11) is pressed once more, the relays (29 and 19) are deactivated thus completing the downward cycle to its original bottom idle setting.

To achieve the setting light without power limitations, there is a bulb (8) placed in front of a reflector (30) which concentrates the light beam and directs it towards a lens (31) in the lower area of the periscope (2), inside which and through the corresponding optical corner mirror means and lenses it is conveyed to the upright of the orifice (5) where the bit is visible, and by this light point which is perfectly sited on the template, we get the exact spot where the bit is located underneath.

The improvements which have been described are organized in this way and all the template boring operations are performed in a simple and automatic manner, and once the automatic control is set, the operator will simply vary the position of the template, for the time established in the flow lag control (16), and at the end of each cycle will receive the corresponding tone to set the template in its new position again.

The advantages which are obtained from these drives are quite clear and readily understood, because since the platform is firm and the drill is mobile, and also the adjustment of the bit can be easily adapted to the needs of each specific moment, this allows the operator to simply worry about fitting the template in the place marked by the setting light.

The shape, materials and dimensions may be variable and also, generally, any accessory and secondary aspect, so long as this does not alter, change or modify the basic features of the improvements which have been described.

I claim:

1. An improvement in template boring machines, comprising:
   a unit containing a light source;
   turning means within the unit for turning a bit to effect rotary movement of the bit;
   elevating means within the unit for elevating the bit to effect upward and downward movement of the bit;
   a fixed upper platform on the unit, the platform having a central orifice for enabling passage of the bit therethrough; and
   means for conveying a beam of light from the light source to coincide with the bit, said conveying means including a column in the form of a periscope which contains an optical system, the column having an entrance which faces beneath the platform for admitting the beam of light and an exit which faces the orifice from above the platform for discharging the beam of light.

2. An improvement as in claim 1, wherein said turning means and said elevating means each include a respective motor operating independent of each other, said turning and elevating means including a circuit for putting each of the motors into motion for causing the bit to turn simultaneously while effecting the upward movement and for causing the bit to turn in an opposite direction while effecting the downward movement, said circuit having means for restricting the upward and downward movement of the bit by stopping operation of a corresponding one of the motors.

3. An improvement as in claim 2, wherein said circuit includes informing means for informing an operator of completion of a cycle of operation of the motors, said informing means remaining activated for a period of time.

4. An improvement as in claim 3, further comprising means operative jointly with said informing means for commencing a repeat of the cycle of operation after the period of time has elapsed.

5. An improvement as in claim 3, further comprising:
   turning on means responsive to the bit being restricted from further downward movement for commencing a repeat of the cycle and for turning on said light source while the cycle is being repeated;
   means for turning off the light source after the period of time has elapsed and the repeat of the cycle has not been commenced; and
   manual means for turning on the light source manually after the period of time has elapsed and the repeat of the cycle has not been commenced.

6. An improvement as in claim 1, further comprising:
   means for adjusting a relative position of the bit independent of said turning means, said adjusting means including means for interrupting said turning means from moving the bit and means for allowing said elevating means to move the bit so that the bit may move in the upward direction without turning.

7. An improvement as in claim 6, wherein said turning and elevating means includes motors which may operate independent of each other, said restricting means including microswitches which respond to attainment of respective end strokes of the upward and downward movements for issuing respective pulses to stop operation of the motors, respectively, said turning and elevating means also including a circuit having means for starting operation of the motors, said circuit also having relays and multivibrators, said multivibrators each exciting a respective one of the relays in response to receipt of respective ones of the pulses for putting the motors into operation, said optical system including a reflector which concentrates the light beam and directs the light beam on a lens to reach angle mirrors within the column so that the light beam emerges in coincidence with the bit.

8. An improvement as in claim 3, wherein said informing means includes an accoustic means which has a piezoelectric buzzer which enunciates at the completion of the cycle.

9. An improvement as in claim 3, further comprising a potentiometer for regulating a time constant which sets the time period.

10. An improvement as in claim 6, wherein said turning and elevating means includes a circuit having relays for controlling activation of the motors, said adjusting means including a divider which produces an output and a multivibrator responsive to the output for activating the relays at the same time that another relay interrupts the turning movement so that the bit may move upward without turning.

* * * * *